US012744144B2

(12) United States Patent
Kandrashou

(10) Patent No.: US 12,744,144 B2
(45) Date of Patent: Sep. 22, 2026

(54) CONSTRUCTION MAGNETIC PANEL AND METHOD OF MANUFACTURE

(71) Applicant: Cuby Technologies Inc, New York, NY (US)

(72) Inventor: Aleh Kandrashou, New York, NY (US)

(73) Assignee: Cuby Technologies Inc, New York, NY (US)

( * ) Notice: Subject to any disclaimer, the term of this patent is extended or adjusted under 35 U.S.C. 154(b) by 280 days.

(21) Appl. No.: 18/110,507

(22) Filed: Feb. 16, 2023

(65) Prior Publication Data

US 2023/0207172 A1 Jun. 29, 2023

Related U.S. Application Data

(63) Continuation-in-part of application No. 17/893,138, filed on Aug. 22, 2022, now abandoned.

(60) Provisional application No. 63/235,201, filed on Aug. 20, 2021.

(51) Int. Cl.

| | |
|---|---|
| ***H01F 7/02*** | (2006.01) |
| ***E04F 13/08*** | (2006.01) |
| ***E04F 15/02*** | (2006.01) |
| ***H01F 1/06*** | (2006.01) |
| ***H01F 41/00*** | (2006.01) |
| ***H01F 41/02*** | (2006.01) |

(52) U.S. Cl.

CPC ............. *H01F 7/0215* (2013.01); *H01F 1/06* (2013.01); *H01F 7/0221* (2013.01); *H01F 41/0253* (2013.01)

(58) Field of Classification Search

CPC ........ H01F 7/0215; H01F 1/06; H01F 7/0221; E04F 13/0883; E04F 15/02144; B32B 27/304; B32B 2307/208

See application file for complete search history.

(56) References Cited

U.S. PATENT DOCUMENTS 3,341,996 A * 9/1967 Jones ................ E04F 15/02144 427/127
2018/0056627 A1 3/2018 Immordino, Jr. et al.

FOREIGN PATENT DOCUMENTS

| | | |
|---|---|---|
| RU | 54338 U1 | 6/2006 |
| RU | 2385391 C2 | 3/2010 |
| RU | 110115 U1 | 11/2011 |

OTHER PUBLICATIONS

International Search Report in corresponding International Application No. 23157310.6.

(Continued)

*Primary Examiner* — Joanna Pleszczynska
(74) *Attorney, Agent, or Firm* — Fenwick & West LLP

(57) ABSTRACT

A construction magnetic panel is provided having a flexible base formed with front and internal sides and including magnetic particles placed within the body of the panel. The magnetic particles are operated within a working temperature range between −60 and +120° C., whereby the magnetic particles are characterized by the maximum energy product $(BH)_{max}$ within the range between 2.0 and 100.00 kJ/m$^3$ and are capable of magnetic interaction with external magnetically susceptible materials.

14 Claims, 6 Drawing Sheets

(56) References Cited

OTHER PUBLICATIONS

Ignatov, A. S. "Research and development of a method for producing flexible magnetic materials based on the Nd—Fe—B system." Dissertation and Abstract Topic According to the Higher Attestation Commission of the Russian Federation May 16, 2002, Candidate of Sciences, Jun. 20, 2018, pp. 1-127, 134 pages submitted, (with English translation of the Introduction to the Dissertation).

* cited by examiner

CONSTRUCTION MAGNETIC PANEL AND METHOD OF MANUFACTURE

CROSS-REFERENCE TO RELATED APPLICATION

This application is a continuation-in-part Application of application Ser. No. 17/893,138 filed Aug. 22, 2022 which claims the benefit of priority from U.S. Provisional Patent Application 63/235,201 filed Aug. 20, 2021, the entire disclosure of those Applications is incorporated herein by reference.

FIELD OF THE INVENTION

The invention relates to building panels in general, and specifically relates to magnetic building panels and methods of making and using the magnetic panels.

BACKGROUND OF THE INVENTION

Russian Patent RU No 54338 discloses a functionally decorative wall panel which comprises a flat base fixed to the wall and is made of a metal sheet and an elastic substrate fixed to panel inside. The metal base is connected by means of fastening elements to functionally decorative elements arranged on the outer surface of the wall panel. A decorative layer of sheet polymer material is formed on the outer side of the panel, and an elastic substrate is formed from a flexible sheet material. There are openings in the decorative layer and in the base which are arranged with a regular vertical and horizontal interval and the fastening elements are provided for the functionally decorative elements with a holding head which is arranged on the inner side of the wall panel. The openings are formed along the profile and provide for the free insertion of the head of the fixing element on the front side of the wall panel and for the retention of the fixing element behind the head on the inner side of the wall panel. The wall panel is divided into sections which are tightly adjacent to each other at the ends thereof during the assembly. So that the holding elements in the form of flat permanent magnets and are arranged on the surface of the panel between the profile openings and the metal base is made of a ferromagnetic material.

Russian Patent RU No 2385391 discloses the panel for internal walls containing magnets mounted on the back surface of the panel for internal walls. The structure comprises iron plates mounted on the wall surface in positions corresponding to the positions of the magnets that the surfaces of the magnets, with the exception of the surface contacting the iron plates are treated with stainless steel. The stainless-steel treatment is carried out by placing magnets in caps made of stainless steel or by vacuum spraying of stainless steel on the surface of the magnets or by applying a stainless steel coating substance to form stainless steel films on magnet surfaces. The magnets are made of an alloy with magnetic induction from 0.15 to 0.35 Tl. The panel for internal walls is formed by attaching an internal film or wallpaper to a basic element selected from a group consisting of a medium-density wooden board (MDF), plywood and a polyester plastic plate or by wrapping the basic element with fabrics. Grooves are formed on the back surface of the panel for internal walls and the magnets are inserted into grooves in such a way that the surfaces of the inserted magnets and the back surface of the panel for internal walls form a level plane. The panel is formed by fixing the internal film or wallpaper to the main element or by wrapping the main element with fabrics for internal walls. The basic element is made of at least one noise absorber selected from a group consisting of fiberglass, polyurethane, polyester or polystyrene noise absorber, melamine or wood wool or foam noise absorber as well as plywood, iron plate acrylic plate, plaster slab, particle board, asbestos slab or plastic plate. The magnets have openings for screws for fixing the panel with the aid of screws to the internal surfaces of the walls that the iron plates are fixed to the wall surface with the aid of a two-sided tape, wherein the magnets and the iron plates are partially mounted.

Russian Patent RU No 110115 discloses a finishing panel having freely rotating permanent magnets fixed in the corps in such a way that they are rotatable in any direction. The magnets are in the form of spheres having a central magnetization for fixing the panel using elements which are arranged outside and are capable of being attracted to permanent magnets. The unit for connecting the finishing panel comprises a supporting element of the structure with fixed magnetic supports for fixing the finishing panel by virtue of the attraction of permanent magnets of the finishing panel arranged opposite the magnetic supports. The unit comprises a magnetic catch which is arranged in a corps made of a non-magnetic material and has a cavity and a flat outer surface with a contact opening open inside the cavity. A permanent magnet in the form of a sphere with a central magnetization is arranged in a cavity which is freely rotatable in any direction, wherein the size of the contact orifice is smaller than the diameter of the standing magnet.

The drawbacks of the known constructions are in the inefficient assemblies and complicated mechanisms for fixing the magnetic elements within the body of the panels which complicates their manufacture and use. One of the closest prior art references known to the inventor comprises a magnetic receiving building panel and a method for the production thereof described in US published patent application US 2018/0056627. One embodiment of the panel disclosed in the publication comprises a plaster core covered at least on one side by a paper sheet and a magnetic element located at least in one of the following places: a plaster core embedded in a paper sheet adjacent to at least one plaster core surface adjacent to at least one paper sheet surface or a combination thereof. In other embodiment, panels are provided in which the elements receiving the magnets are arranged in the form of different drawings: a disconnected drawing, a discontinuous drawing, a continuous drawing, a grid, an array geo-metrically spaced, randomly spaced, which is separated in at least one direction and any combination thereof. Other options include at least two magnetic elements arranged so that the angle and distance between the elements can have any value. The magnetic element can contain a ferromagnetic material selected from a group consisting of iron, nickel, cobalt, alloys with rare earth metals and any combination thereof. The magnetic elements can be in the form of a magneto-receiving tape, a magneto-receiving sheet, a magneto-receiving paint, a magneto-receiving coating, a foil, a gasket, a magnetic tape, a magnetic sheet, a magnetic paint, magnetic coating and any combination of them. Also, in some embodiments of the invention, the elements receiving the magnet have magnetic properties and can function as a magnet. Various embodiments of the building panel can be made of drywall or in the form of cement binder panels, or a plastic panel in the form of a ceiling tile. In some embodiments of the invention, the panel has a cover sheet which can be applied to magnetic elements, wherein suitable cover sheets include paper, plastic, coating and any of the com-bindings.

The method for producing a plaster panel comprises arranging at least one magnetic element on a plaster panel. The magnetic elements are arranged on the gypsum panel in at least one of the following ways: the application of the magnets of the perceptible elements to at least one surface of the gypsum panel; and the printing of the magnetic elements on at least one surface of the gypsum panel. Attachment of magnetic elements with the aid of glue to at least one surface of the gypsum panel; attachment of magnetic elements with the aid of a structural design or a mechanical fixing device to at least one surface of the gypsum panel forms a part of the disclosure. The placement of sensitive magnets on the surface of the plaster panel which has not been fully cured; and any combination thereof are also disclosed. In other embodiments of the implementation of the method, a set for producing a building panel is proposed, this set comprises an element selected from a group and consisting of a magneto-receiving tape, a magneto-receiving sheet and magneto-receiving paint; Glue, resonator, magnetic induction signal repeater (MI) and any combination thereof. The set can additionally include a magnet selected from a group consisting of alnico magnets, ferromagnetic magnets, rare earth magnets, ceramic magnets, neodymium magnets and any combination thereof. One embodiment of the implementation of the method consists of producing a magnet-receiving substance which is connected to a wall, including floors, ceilings, the front and/or back sides of a wall partition, or is incorporated into a wall. A magnetic element may be directly or indirectly linked to an object. In some embodiments of the invention, the magnetic element is connected to the object by means of a rope or wire. Various objects can be fastened to a structural panel containing magnetic elements without the use of nails or screws. Such objects include, for example, a lamp, a radio receiver, a screen or a fan. The assembled building has walls which comprises said building panels a ceiling and/or a floor with panels having a drawing of one or more magnetic-receptive elements, wherein one or more magnetic-perceptive elements are applied, at least one surface of the building panel and/or built into the building with said panels.

A major drawback of the above-noted Patent Publication is the narrow range of materials used for the manufacture of panels, such as plaster and cement, as well as the low performance properties of these materials.

One of the objects of the present invention is to eliminate the above-noted drawbacks of the prior art and to extend the field of use of construction panels with magnetic elements. The present invention results in a substantially enhanced quality of the finishing magnetic panels and makes it possible to improve the operational properties of the magnetic building panels and to extend the range of their use.

General Considerations

Current and future construction industry transformation advances are taking place within the backdrop of significant challenges. These include production sustainability, constant shortage of skilled workers, transition to more carbon-neutral, environmentally friendly models, clean energy logistics (biomass fuels, hydrogen, electrification), materials tracking via digital identity, automated operations, intelligent control systems, information security, supply chain coordination/visibility, optimized planning, forecasting, and materials replenishment.

Invention systems and related technology influence the issues identified above in unique and innovative ways. As detailed in this document, proprietary systems, techniques, methods, and procedures address the entire planning, production, design, and construction process as it improves the efficiency and sustainability of large-scale, multistory residential and commercial structures.

Aspects of this invention can integrate and use modular structures, assembly technology and associated processes in one embodiment.

The construction of residential and commercial structures is a complicated and complex process. For example, the typical American single-family home is estimated to contain more than 300 distinct components comprising hundreds of individual parts—each having an impact on the quality, appearance, lifecycle, and durability of the structure.

Considering the materials used in construction is critical as most significant components are made from natural materials. Typically, lumber is used for framing, siding, and flooring. As it dries over time, it may be subject to warping or cracking. It is unreasonable to expect natural materials to be perfect or remain intact for the structure's lifetime. Traditional building techniques leave the structure exposed to the environment and subjected to weather conditions throughout the process. The complexity of these and many more factors escalates significantly when undertaking large-scale projects.

Essential standardization and simplification factors of the technology described in aspects of the present invention include design flexibility. Design flexibility can include simple, repeatable, and scalable elements leveraged for specific development plans and large-scale projects. Structural elements can be added to meet regional location, seismic, and weather zone requirements. Design flexibility can accommodate structures of various sizes and shapes—allowing further expansion and acceleration of construction by introducing customized adaptations to diverse building site conditions.

Further, aspects of this invention include accommodations for ease of transportation of each discrete module is optimized during the production process to streamline and facilitate transportation. Predesigned and precast modular components ensure standardized dimensions comply with all applicable regional and local regulations and seamlessly match on-site platform assembly.

Further, aspects of this invention include systems and methods to increase energy efficiency. For example, this invention may involve use of organic foam "sandwich panel" core technology, solid insulating materials, thermally insulated contours, and unique attachment techniques eliminate through joints to improve HVAC and sound insulation properties. This invention will integrate with unique insulation materials, panel design, and technology.

Additionally, aspects of the present invention include systems and methods to optimize for production quality. Production quality refers to the production of all components is completed in a hybrid manufacturing factory environment, under highly controlled conditions, which results in strenuously tested solutions. Strict adherence to prescribed standardization and manufacturing tolerances avoid construction problems often observed in traditional building projects. If needed invention can integrate with precise quality controls and software technology.

With production time accelerated significantly in the hybrid manufacturing facility with the construction site, aspects of this invention allow construction teams to complete the building structure significantly faster than the current building-rate average. The simplified, completed structure retains the highest quality, durability, structural strength, and functional qualities. If needed the invention can integrate with manufacturing and associated production technology.

This invention can integrate and utilize simplification and standardization technologies and associated processes in one embodiment.

Controlled planning and efficient production sequencing are incorporated early in the design phase, maximizing material resources, reducing production time, monitoring management, and maintaining established budgets. The repetitive elements, maximization and deployment of resources, and the novel prefab manufacturing process speed all production and on-site assembly phases. If needed invention may integrate with repeatable manufacturing processes.

All panelized and pre-manufactured elements, assemblies, systems, and components minimize total piece (i.e., construction item) counts and facilitate rapid assembly and faster access to all areas of the structure. Pre-manufactured sandwich wall panels include insulation and thermally insulated contours eliminating the need for additional insulation after assembly and construction. Precast and manufactured elements also provide enhanced fire rating standards far beyond those required by established regulations. If needed the invention may integrate with pre-manufactured elements, assemblies, and systems.

This invention can integrate and utilize the speed of installation and premanufacturing technologies and associated processes in one embodiment.

Over time, modular structure standardization allows for an extensive list of repeatable options, including traditional and non-traditional architectural possibilities, purpose-built molds, customized etching options, and texture options (i.e., smooth, sand, exposed aggregate, polished and honed finishes). In addition, integral color tinting is possible using various pigments and finishing applied at the manufacturing plant.

This invention can integrate and utilize product standardization manufacturing technologies and associated processes in one embodiment.

These Invention modular precast structures provide functional and aesthetic design flexibility and options, including exterior and interior wall deployment, structural elements, decorative panel techniques, and material finish options. Modular production and associated systems offer economy, design freedom, and almost universal availability.

Large-scale construction projects are becoming increasingly complex. This new level of complexity still requires meeting time or budget parameters—and careful planning to complete the project. Modular and prefab construction with traditional steel and concrete is becoming a preferred alternative for large residential and commercial projects, including multi-residential structures, hospitals, schools, mid and high-rise structures, and rural and urban applications.

This Invention of modular construction techniques offers significant advantages in large-scale builds, including (1) Superior strength, which is a key value as the standard elements are manufactured to bear greater loads. Uniquely designed exterior and interior wall structures, supporting columns, and crossbars reduce the need for deep foundations and added structural support. Buildings can be constructed with more levels while retaining safety and stability—significant in large-scale projects. In addition, standard elements require minimal maintenance vs. other construction materials; (2) Versatility relating to embedding utility, water, sewage, electrical, communication, and other services within internal columns and structures is a critical value in modular design and construction. Predesigned access to all structure systems allows rapid assembly during the construction phase and easy maintenance after project completion; (3) Superior durability, the use of prefab modular elements results in buildings that offer superior protection against the elements, including heavy rain and flooding. This is important for large-scale projects with extended life spans, reducing the need for extensive recurring maintenance. Under certain conditions, new modules can be efficiently and cost-effectively attached to an existing structure at a future date. Conversely, it is possible to disassemble an existing structure and reassemble it at a new location.

With current environmental sensitivity trends, large-scale buildings must be as energy efficient as possible to reduce recurring operational costs. The thermal efficiency of prefab elements provides a significant advantage over other materials. Aspects of this invention may incorporate a so-called "ECO-WALL" option which comprises various types of ecologically friendly and sustainable "fillers" in the core of the construction panel(s), specifically *miscanthus*-based block can provide a "green" option. This raw material comprises crushed, dried stems and leaves of the giant *miscanthus* plant. The use of the vegetable component integrates two modern trends—to create an efficient thermal insulation that is a more environmentally friendly building material and to bind atmospheric carbon in the form of *miscanthus* biomass permanently. This makes it possible to practically nullify the carbon footprint of cement production for the concrete component of the entire structure.

Safety features, prefab elements are a superior construction choice to limit the impact of fire spreading throughout a building and are a preferred material for constructing stairwells and interior structures in large buildings. Concrete will sustain minimal damage if a fire event does occur. Concrete's strength and uniform nature also provide a superior level of resistance to rust and chemical corrosion; Noise reduction may be achieved by aspects of the invention due to the density of the material and modular construction techniques. Prefab modular elements designs are ideal for sound walls and reducing noise's impact within a large structure. Prefab modular elements also allows Wi-Fi network signals to transmit through the material, making it an ideal option for "smart building" technology.

The construction industry faces growing demands from various ecological, economic, skilled labor, and organizational pressure points. Building requirements must meet increased compliance and regulatory thresholds while maintaining sustainable building solutions. This Invention system is designed to provide improved cost efficiency, shorter and more controlled construction times, and enhanced construction quality and sustainability.

Prefab modular elements have the design flexibility to provide unique looks in residential and commercial projects for interior and exterior design options. Versatility is a key design component in prefab modular elements, offering attractive building solutions, including (1) sustainability. As modular design opportunities expand, upgradability, serviceability, and flexibility are only a few of its characteristics. Being able to adapt and improve existing structures with efficient technologies at less expense is a crucial driver for the architectural features both now and in the future; (2) Customization prefab modular elements do not lack originality but instead offer a broad pallet of unique exterior and interior design and layout options opportunities, which is why today designers recognize the limitless opportunities offered by modular prefab element components. If needed the invention can integrate flexible and customizable architectural designs.

This invention can integrate flexible interior and exterior design opportunities and innovative technology and associated processes in one embodiment.

Some embodiments of this disclosure, illustrating its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms “a” “an,” and “the” include plural references unless the context clearly dictates other-wise. Although systems and methods similar or equivalent to those described herein can be used in the practice or testing of embodiments, only some exemplary systems and methods are now described.

SUMMARY OF THE INVENTION

According to invention the construction magnetic panel comprises a base with front and inner sides and magnetic structures which are arranged at least on a surface of the inner side or within a body the base. According to one embodiment of the invention, the base is rigid. As an example, the base can be made of glass, a metal, or pressed craft paper with moisture impregnation and any combination thereof. As to another embodiment, the base can be flexible, and for example, can be made of a fabric, or flexible plastic and any combination thereof having a working temperature interval between −60 and +120° C. The magnetic particles are characterized by the/the maximum energy product $(BH)_{max}$ within the range between 2.0 and 100.00 kJ/$m^3$ and are capable of magnetic interaction with external magnetic-receptive materials. In an alternate embodiment the front side of the base can include a decorative ornament with a specified drawing.

The flexible plastic base is a mixture of polymers with magnetic particles in the form of a magnetic powder with size of particles not exceeding 0.05 mm, in particular vinyl with magnet properties and is characterized by the maximum energy product $(BH)_{max}$ within the range between 2.0 and 100.00 kJ/$m^3$.

When a flexible fabric is used in the manufacturing of the base, the following composition can be utilized: for example, fibrous fabric impregnated with an acrylic latex including magnetic particles in the form of a dispersed magnetic powder/filler with size of particles not exceeding 0.05 mm and is characterized by the maximum energy product $(BH)_{max}$ within the range between 2.0 and 100.00 kJ/$m^3$.

The flexible fabric base can be fixed to a glass or metal or to a pressed craft paper and any combination thereof by means of an adhesive joint having the breaking force which is at least twice greater than the force of magnetic attraction with external magnetic susceptible materials. It is impregnated with acrylate latex with dispersed magnetic powder with size of particles not exceeding 0.05 mm. According to the method of manufacturing the construction magnetic panels of the invention, one or more magnetic particles are connected to at least one side of the base by an adhesive joint, by using a mechanical fastening device, by embedding one or more magnetic particles into the base body, or by any combination thereof.

According to the invention, a rigid base can be made, for example, of glass, a metal, or from compressed craft moisture impregnated paper. On the other hand, a flexible base, for example, can be made of fabric or flexible plastic and any combination thereof operated at a temperature interval between −60 and +120° C. Magnetic particles are then implemented into the flexible base in the form of a powder with the maximum energy product $(BH)_{max}$ within the range between 2.0 and 100.00 kJ/$m^3$. The resulting composition is capable of a magnetic interaction with external magnetic-receptive materials. The front side of the panels is provided with decorative finishing with a given drawing.

The base is produced from a mixture of polymers in the form of a flexible/resilient plastic, for example, vinyl and any combination thereof, wherein the magnetic particles are implemented in the form of magnetic powder with size of particles not exceeding 0.05 mm with the maximum energy product $(BH)_{max}$ within the range between 2.0 and 100.00 kJ/$m^3$, a flat and/or volumetric drawing can be provided on the front side of flexible/resilient vinyl with magnet properties.

The flexible fabric base is made, for example, from fibrous fabric into which magnetic particles are implemented by impregnating with an acrylic latex having magnetic powder in the form of a dispersed magnetic powder with size of particles not exceeding 0.05 mm and with the maximum energy product $(BH)_{max}$ within the range between 2.0 and 100.00 kJ/$m^3$.

The flexible/resilient vinyl having magnetic properties is fixed by an adhesive on a rigid base made of glass, or of metal, or of compressed craft paper (or of a ceramic, or of a wood, or of a plastic, or of a rubber, or of a textile, or of a leather, or of a stone, or of a pressed craft paper and any combination thereof (or almost of any both natural or synthetic glueable materials or their combination or any suitable simple or complex object, including electronic devices) and any combination thereof, wherein the breaking force of the adhesive joint is at least twice exceeding the magnetic attraction force with external magnetic attractions susceptible materials.

The flexible fabric with the dispersed magnetic powder with size of particles not exceeding 0.05 mm is fixed by gluing to a rigid base made of glass, metal, pressed craft paper, and also including the following materials: ceramic, wood, plastic, rubber, textile, leather, stone, and any combination thereof. In actuality, almost any natural or synthetic glueable materials or their combination are covered by the invention. The breaking force of the adhesive is at least twice exceeding the force of magnetic attraction with external magnetic-receptive materials. Magnetic particles in the form of a magnetic powder with size of particles not exceeding 0.05 mm having the predetermined characteristics of energy density are implemented into the body of a rigid base made of glass, metal, pressed craft paper, ceramic, wood, plastic, rubber, textile, leather, stone, and/or any combination thereof with impregnation on the internal side thereof having maximum energy product $(BH)_{max}$ within the range between 2.0 and 100.00 kJ/$m^3$.

BRIEF DESCRIPTION OF THE DRAWINGS

In the following drawings, the same parts in the various views are afforded the same reference designators. Referring now to the drawings which are provided to illustrate and not to limit the invention, wherein.

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION OF THE INVENTION

Figure 1:
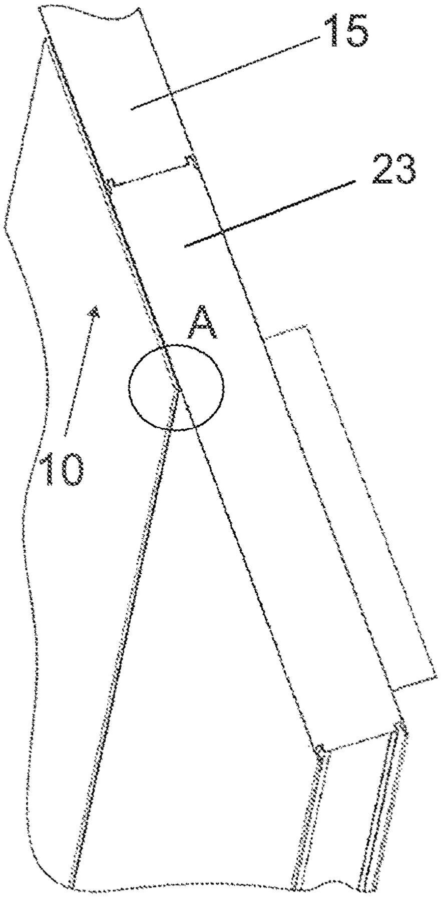
FIG. 1 is a general view showing a connection between a magnetic panel and an outer surface of a wall of a building.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance, or illustration. The embodiments described herein are not limiting but rather are exemplary only. The described embodiments are not necessarily to be construed as preferred or advantageous over other embodiments. Moreover, the terms embodiments of the invention, embodiments, or invention do not require that all embodiments include the discussed feature, advantage, or mode of operation.

Magnet panels could be used for interior and exterior decoration both as single or multilayer products. A single-layer magnetic panel is a soft or hard magnetic base with a print, pattern, or moulded relief applied to its front side, which in essence is a direct part of the magnetic base, or a thin decorative layer applied directly to it. A multilayer magnetic panel is a soft or hard magnetic base with an adhesive composition applied to its front side for fixing over the entire area or only on some part of the magnetic base of mostly non-magnetic soft or hard materials, such as glass or ceramic, or wood, or plastic, or rubber, or textile, or leather, or stone, or metal, or pressed craft paper and any combination thereof (or almost any of both natural or synthetic glueable materials or their combination, or any suitable simple or complex object, including furniture or electronic devices). Also, on the front side of the internal panel could be glued, for example, brackets for hanging small relatively lightweight items on the walls (lamps, paintings, pictures, other decorative elements, bookshelves, small cabinets, LCD or plasma monitors/TVs, fire extinguishers, sensors and cameras, tablets, buttons, sockets, hooks for hanging clothes or bicycles, etc.). With a large area of contact between the suspended element and the wall, the magnetic material can be glued by front side directly to the surface of the object in contact with the wall, for example, over the entire surface of a cabinets or bookshelves. Thus, the number of variants of the products obtained on magnetic bases is practically inexhaustible. On the front side of the magnetic bases for exterior trim panels, in addition to all the suitable materials or items listed above for interior trim panels, could be glued, for example, solar panels, advertising, architectural elements, etc. or brackets for their attachment.

In addition to structural and architectural enhancements, interior designs can also be supplemented with a variety of components, including but not limited to: (1) Built-in living fixtures, including prefabricated seating, shelving, and storage, kitchen accessories, fireplace, and heating options are only a few, as precast built-in fixtures offer an ideal canvas for many in-home furnishings; (2) Magnetic wall coverings or the more inclusive term "smart surface technology" also provides an innovative component of aspects of this invention. Magnetic Wall coverings are high-performance materials that combine easy installation with various designs, digital prints, textures, and colors. Suitable for residential and commercial interiors, these lightweight wall coverings offer a smooth and seamless surface and can be quickly updated and changed anytime. These innovative magnetic panels can quickly "reinvent" interior space and can be affixed vertically, horizontally, or on curved surfaces, made from environmentally friendly and sustainable materials.

Figure 2:
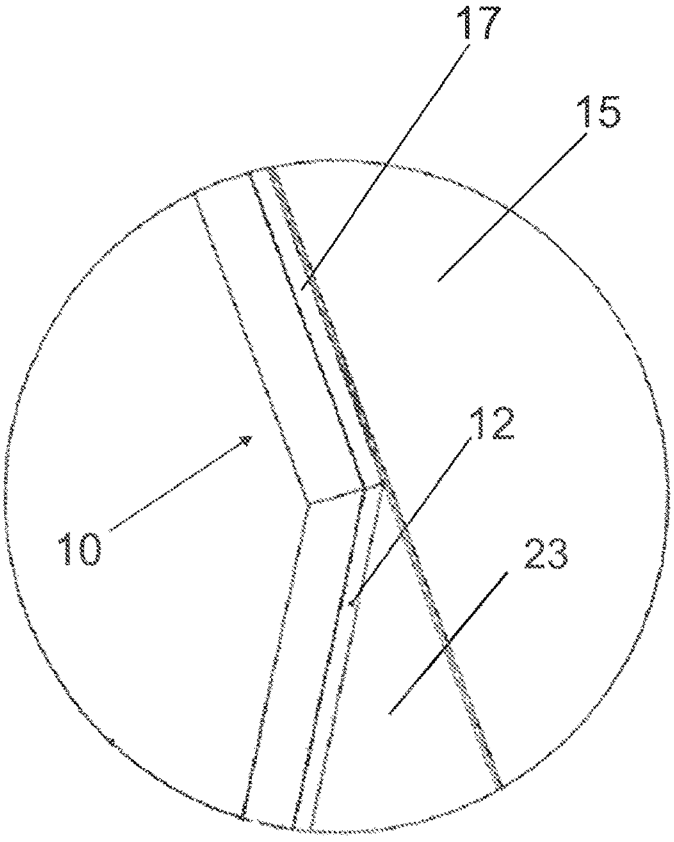
FIG. 2 is an enlarged view of detail A shown in FIG. 1.
Figure 3:
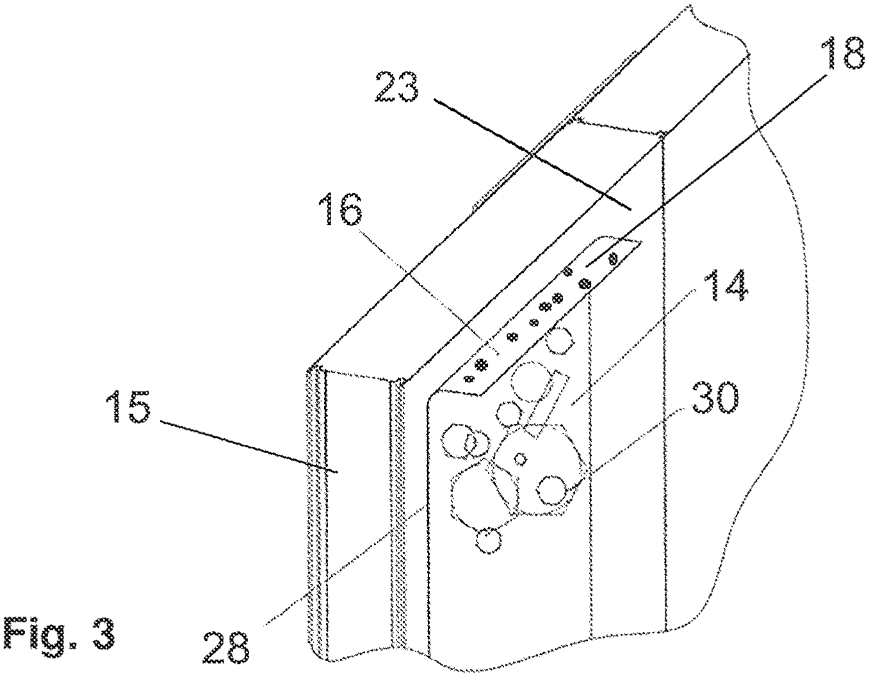
FIG. 3 is a view illustrating attachment of the magnetic panel having a flexible plastic base to an internal surface of the wall of a building.

Referring now to FIGS. 1-9 of the drawings showing various embodiments of a building/construction magnetic panel 10 of the invention. FIGS. 1, 2 and 3 specifically illustrate connection between the magnetic panel 10 and a surface of the wall 15 of a building, including the magnetically susceptible or steel exterior 23. The panel 10 typically consists of a base 12 having an outer side layer 14 and an inner surface layer 16. The base 12 comprises an elastic flexible carrier material.

In the formation of the panel 10 the magnetic particles 18 are distributed evenly over the surface layer 16 or the entire body/volume 17 of an elastic/flexible carrier material of the base 12. The magnetic particles 18 are provided as a powder of the class of magnetic hexaferrites, such as barium ferrite, or, for example, a powder of the class of magnetic spinels, such as magnetite, or any other powder exhibiting magnetic properties, with the particle size of not more than 0.05 mm with a Curie temperature (point) of at least 300° C. The flexible carrier material of the base 12 can be made, for example, from a material based on polyvinyl chloride with plasticizing additives (including low and high molecular weight), for example, polyethylene chloride (as a high molecular weight additive), The magnetic panel 10 can be produced by, for example, thorough mixing the magnetic powder with the melt of the carrier material to produce a mixture. Further manufacturing steps include profiling the mixture into a roll of film of a relatively soft flexible material having an approximate thickness between 0.3 and 3.0 mm, whereas the roll can be formed having the width of up to 3000 mm. In the formation of the roll of film conventional methods can be utilized, such as for example, calendering. In order to provide the resulting material of the panel 10 with the properties of a permanent magnet characterized by maximum energy product $(BH)_{max}$ within the range between 2.0 and 100.00 kJ/$m^3$ of the resulting material, such material further undergoes an additional processing, for example, by an external magnetic field.

The film, in the case of distribution of the magnetic powder over the entire body/volume 17 of the carrier material represents a homogeneous material. In the case of the distribution of the magnetic particles 18 over the surface 16, the carrier material is a two- or more-layer film consisting of the layers having different compositions. For example, the outer side layer 14 may be a non-magnetic elastic film intended for applying images, for example by UV printing.

Figure 4A:
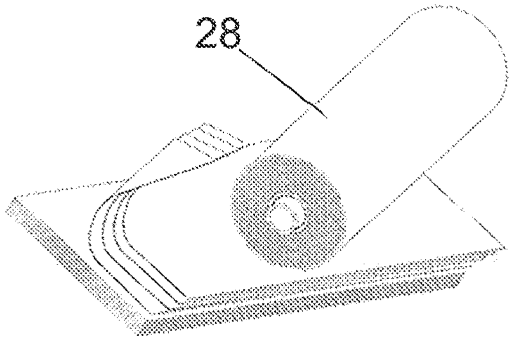
FIGS. 4A and 4B illustrate a fragment of the flexible plastic base including magnetic particles.
Figure 4B:
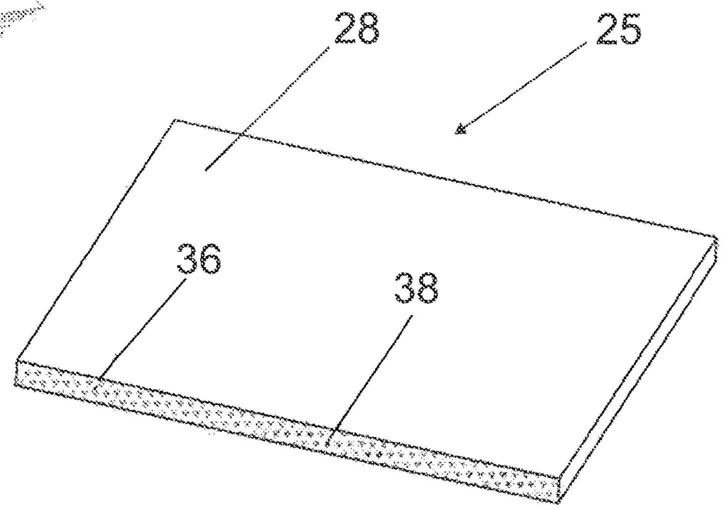

In the embodiment of FIGS. 4A and 4B, the material of the base 25 utilizes a flexible plastic film 28 having the properties resembling an elastic, soft linoleum, which is made utilizing a mixture of polymers 36, including vinyl, with the implemented magnetic particles 38. The panel of this embodiment can be utilized for interior finishing and fixing to the surface of a building wall.

Magnetic particles, which can be, for example, a magnetic powder 38 of the class of magnetic hexaferrites, such as barium ferrite. The magnetic particles can be also a powder of the class of magnetic spinels, such as magnetite, or any other powder exhibiting magnetic properties not exciding 0.05 mm, characterized by maximum energy product $(BH)_{max}$ within the range between 2.0 and 100.00 kJ/$m^3$. The plastic base 25 can be used within the operating temperature range between −60 and +120° C. The magnetic particles 18 utilized by the invention are capable of a magnetic interaction with external magnetically-receptive materials, such as for example metallic elements of the wall 15 of a building and are typically characterized by maximum energy product $(BH)_{max}$ within the range between 2.0 and 100.00 kJ/$m^3$. In some embodiments (see FIG. 3) the front side layer 14 of the panel 10 can be provided with a decorative finishing having a predetermined ornament 30. Further, elements of magneto-susceptible materials can be embedded into the wall surface.

Figure 5:
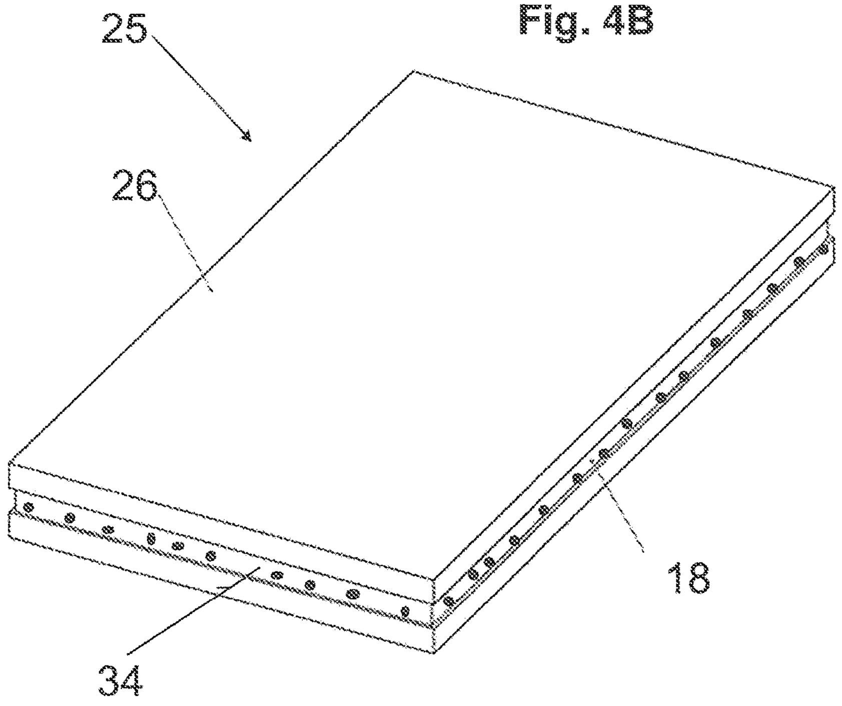
FIG. 5 illustrates a fragment of a flexible fabric base with magnetic particles embedded with the size of particles not exceeding 0.05 mm.

Referring now to the embodiment of FIG. 5, having the base manufactured using the flexible fabric 26, such as a fibrous fabric, for example. In this embodiment the magnetic particles 18 are, for example, in the form of magnetic filler/magnetic particle powder 34 of the class of magnetic hexaferrites, such as barium ferrite, or, for example, a powder of the class of magnetic spinels, such as magnetite, or any other powder exhibiting magnetic properties and not exciding 0.05 mm. The magnetic particles are fixed/attached to the surface of a soft and flexible carrier material, e.g., textile fiber 26 by means of an adhesive, e.g. acrylic latex glue/lacquer. In this process impregnation the fabric with a liquefied acrylic latex composition is involved. The magnetic powder 34 characterized by maximum energy product $(BH)_{max}$ within the range between 2.0 and 100.00 kJ/$m^3$ can be introduced into the acrylic latex composition, by, for example, by mixing until the particles of the magnetic powder are evenly distributed in the solution of the specified adhesive. This occurs before the resulting mixture is applied to the surface of the material 26. If necessary, after the latex has hardened, the obtained material 26 is treated with an external magnetic field to form the properties of a permanent magnet in the material.

Figure 7A:
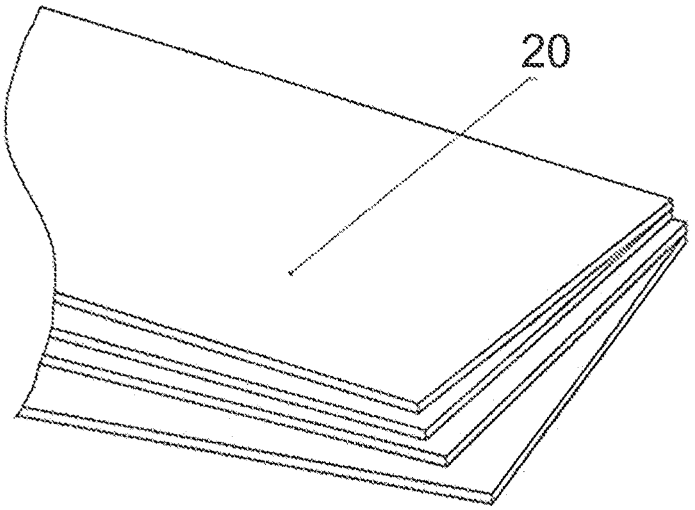
FIGS. 7A and 7B illustrate one embodiment the rigid base made of a glass with implemented magnetic particles.
Figure 7B:
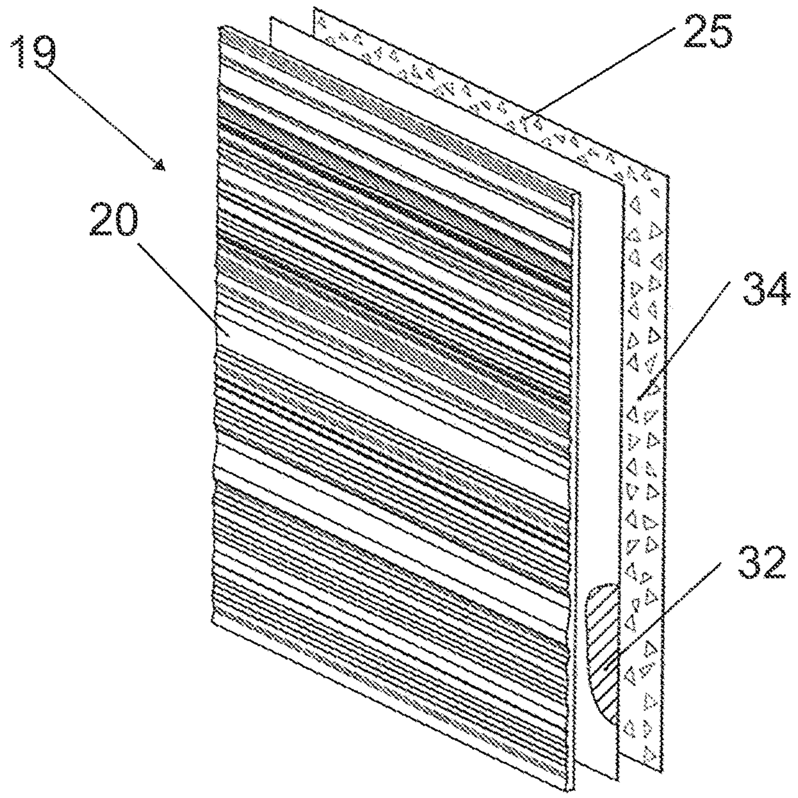
Figure 8A:
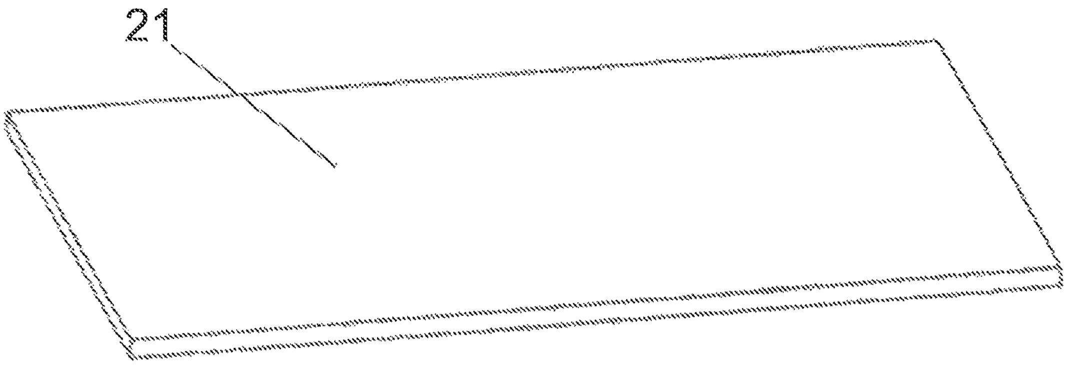
FIGS. 8A and 8B illustrate another embodiment of the rigid base made of a metal with the implemented magnetic particles.
Figure 8B:
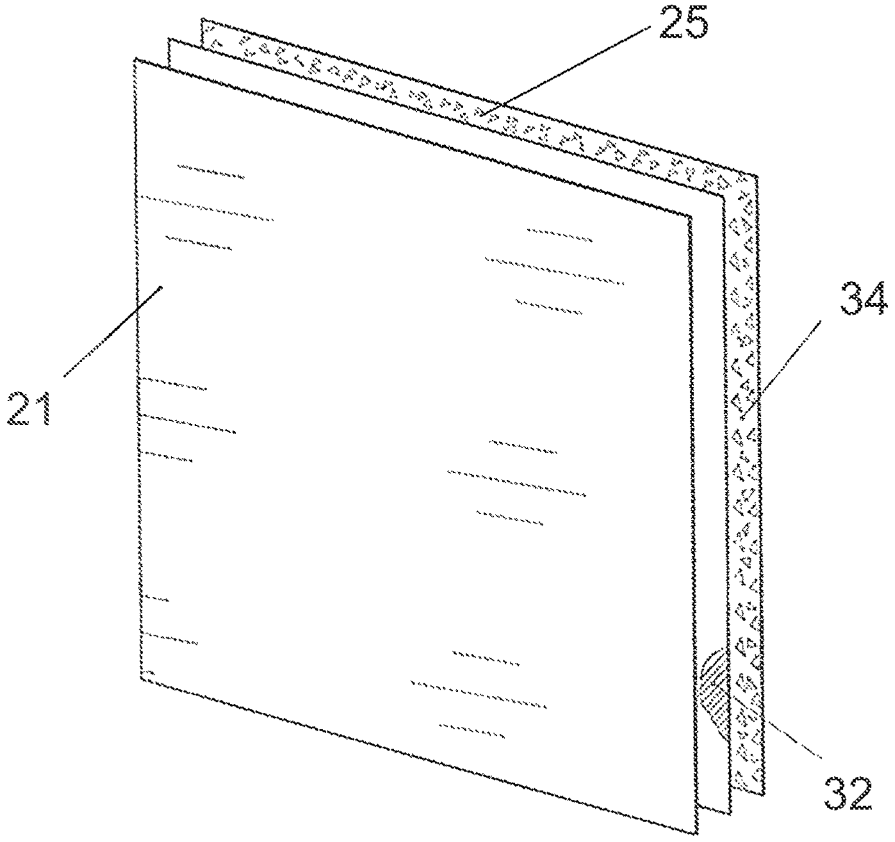

Referring now to the embodiments of FIGS. 7A and 7B as well as 8A and 8B, wherein the flexible base/elements 25 is produced utilizing the flexible plastic (see also FIGS. 4A and 4B) or the flexible fabric (see also FIG. 5). The base/elements 25 are attached to the sheets of the glass 20 (FIGS. 7A, 7B) or the metal plate 21 (FIGS. 8A, 8B). The magnetic particles in the form of the magnetic powder 34 are implemented into the flexible base 25 by the methods discussed in the application. The base 25 having the magnetic particles is attached to the glass 20 or the metal plate 21 by means of an adhesive joint 32, such as a glue which can be for example one- and two-component polyurethane adhesive or epoxy resin. The breaking force of separation of the adhesive joint 32 is selected to be at least twice higher than the magnetic attraction force to a steel/metal surface of the flexible plastic (vinyl, for example) having the magnetic particles or twice higher than the magnetic attraction force of fibrous fabric with magnetic particles in the form of impregnation with acrylate latex having the dispersed magnetic particles.

Although the panels 19 and 21 are being described utilizing glass and metal in their structure, it should be understood that the magnetic panels of the invention can utilize various materials such as, for example ceramic, wood, various plastics, rubber, textile, leather, stone, pressed craft paper and any combination thereof. In actuality, any natural or synthetic glueable materials or their combination can be used for the formation and use of the magnetic panels of the invention.

In the method of manufacturing of the construction magnetic panel of the invention one or more magnetic particles are secured within at least at one of the front side 14 or the inner side 16 of the base by means of an adhesive joint 32, such as a glue which can be for example one- and two-component polyurethane adhesive or epoxy resin. Alternative methods include use of a mechanical fixing device, or by embedding (implementing in the form of a magnetic powder 34) of one or more magnetic particles into the base. Use of other conventional methods or any combination of the above-discussed approaches are within the scope of the invention. To assure a reliable magnetic interaction with third-party magnetically susceptible materials, the magnetic particles 18 are provided characterized by maximum energy product (BH)max within the range between 2.0 and 100.00 kJ/m3.

Figure 6A:
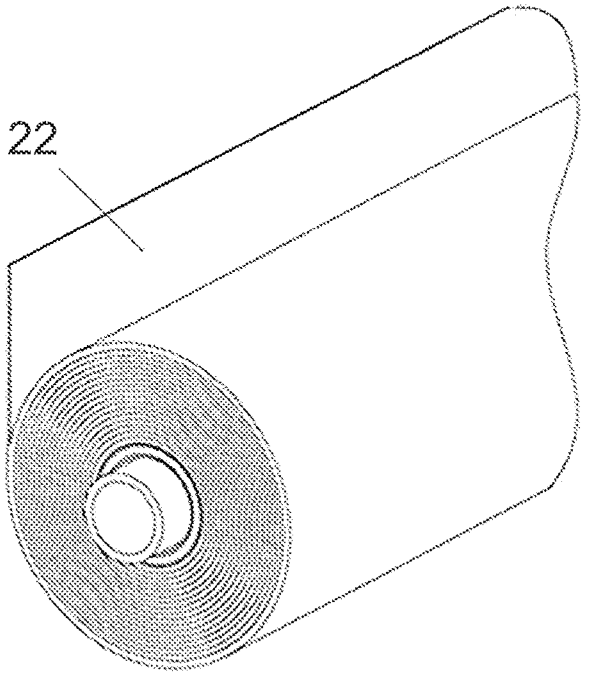
FIGS. 6A and 6B illustrate another embodiment of the flexible base.
Figure 6B:
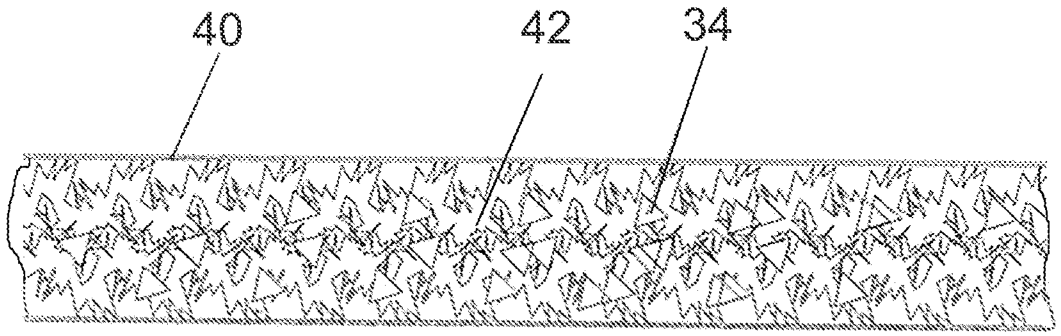

The embodiment of FIGS. 6A and 6B illustrate a base 22 made from a pressed craft paper 42 extending between two water resistant layers 40 and impregnated with the magnetic powder 34.

Figure 9:
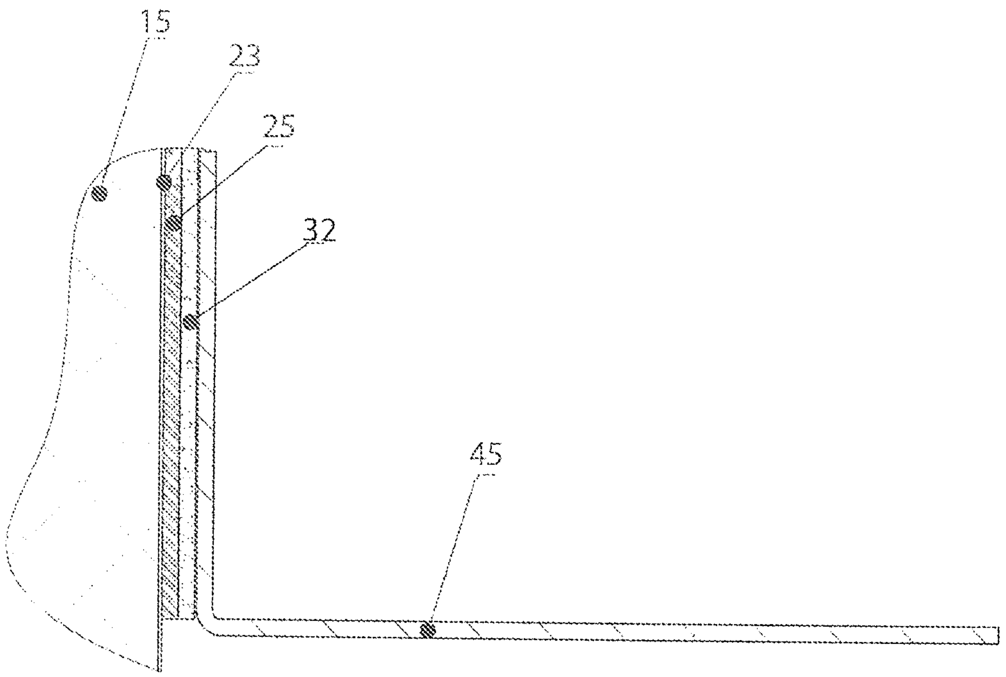
FIG. 9 illustrates a further embodiment of the invention.

FIG. 9 illustrates another embodiment of the invention showing a bookshelf 45 attached to a wall 15 having the magnetically susceptible or steel exterior 23 by means of the magnetic panel 25 of the invention and the adhesive joint 32. The adhesive joint 32 is a glue which can be for example one- and two-component polyurethane adhesive or epoxy resin.

The present invention exhibits a substantial number of advantages compared to the known prior art, for example, by providing simple installation and removal of the panel 10. This makes it possible to change rapidly the appearance of the exterior of the building wall and interior of the premises. Another important advantage of the invention is the absence of the requirement for the highly skilled labor used in the installation of the panels 10 and the need for special equipment. Further advantage of the invention is producing the magnetic panels from a variety of materials and coatings such as for example, paper-layered plastic, glass, metal, ceramic, wood, rubber, textile, leather, stone, pressed craft paper and any combination thereof (practically any natural or synthetic glueable materials or their combination, or any suitable simple or complex object, including electronic devices). The possibility of arranging the magnetic panels in various combinations on a wall of a building is also very beneficial.

What is claimed is:

1. A construction magnetic panel, comprising:

a rigid base; and a flexible layer dispersed with magnetic particles, said magnetic particles that retain magnetic property within a temperature range between −60 and +120° C., whereby said magnetic particles are characterized by maximum energy product $(BH)_{max}$ within the range between 2.0 and 100.00 kJ/$m^3$ and are capable of magnetic interaction with external magnetically-susceptible materials, wherein the flexible layer is adhered to the rigid base and an adhesive force between the flexible layer and the rigid base is at least twice of a magnetic force generated by the magnetic particles.

2. The construction magnetic panel according to claim 1, wherein said rigid base is solid and selected from the group comprising: a glass, a metal, a compressed kraft paper with moisture-proof impregnation, a ceramic, a wood, a plastic, a rubber, a textile, a leather, a stone and any combination thereof.

3. The construction magnetic panel according to claim 1, wherein said magnetic particles are placed at least on a surface of the flexible layer, wherein said flexible layer is selected from the group comprising: a fabric and a plastic.

4. The construction magnetic panel according to claim 3, wherein said flexible layer is made of the plastic, said plastic is a polymer mixture having incorporated said magnetic particles in the form of a magnetic filler including vinyl with magnetic properties characterized by the maximum energy product $(BH)_{max}$ within the range between 2.0 and 100.00 kJ/$m^3$.

5. The construction magnetic panel according to claim 3, wherein said flexible layer is made of the fabric, said fabric is a filamentary fabric including acrylate latex with magnetic particles in the form of a dispersed magnetic filler characterized by the maximum energy product $(BH)_{max}$ within the range between 2.0 and 100.00 kJ/$m^3$.

6. The construction magnetic panel according to claim 2, wherein said magnetic particles are embodied throughout the flexible layer in the form of a magnetic powder.

7. The construction magnetic panel according to claim 3, further comprising a decorative ornament placed on a front surface of the rigid base.

8. The construction magnetic panel according to claim 2, wherein a flexible/resilient vinyl base with the magnetic properties is attached to a nonmagnetic trim element, said trim element is selected from the group comprising: a glass, a metal, a compressed kraft paper with moisture-proof impregnation, a ceramic, wood, plastic, rubber, textile, leather, stone and any combination thereof.

9. A method of manufacturing of the construction magnetic panel according to claim 2, comprising the following step:

embedding at least one said magnetic particle on a surface of the internal/rear side of the base, wherein said at least one magnetic particle is capable of magnetic interaction with external magnetically susceptible materials.

10. The method of manufacturing the construction magnetic panel according to claim 9, further comprising the step of producing the base from a polymer mixture with said at least one magnetic structure in the form of a magnetic filler having resilient/flexible and magnet properties characterized by the maximum energy product $(BH)_{max}$ within the range between 2.0 and 100.00 kJ/$m^3$.

11. The method of manufacturing the construction magnetic panel according to claim 9, further comprising the step of producing the base from the flexible fabric, wherein said flexible fabric is a filamentary fabric including acrylate latex with magnetic particles in the form of a dispersed magnetic filler characterized by the maximum energy product $(BH)_{max}$ within the range between 2.0 and 100.00 kJ/$m^3$.

12. The method of manufacturing the construction magnetic panel according to claim 9, further comprising the step of attaching a vinyl with particles having magnetic properties to the rigid base, said rigid base is selected from the group comprising: glass, metal, pressed kraft paper, ceramic, wood, plastic, rubber, textile, leather, stone or any combination thereof, said attaching is by means of an adhesive joint, wherein a breaking force of the adhesive joint is at least twice greater of the magnetic attraction force with external magnetically susceptible materials.

13. The method of manufacturing the construction magnetic panel according to claim 9, further comprising the step of embedding the flexible fabric with dispersed magnetic filler by means of an adhesive compound to the solid base, said rigid base is selected from the group comprising: glass, metal, pressed craft paper, ceramic, wood, plastic, rubber, textile, leather, stone or any combination thereof, wherein the breaking force of the adhesive compound is at least twice greater of the magnetic attraction with external magnetically susceptible materials.

14. The method of manufacturing the construction magnetic panel according to claim 9, further comprising the step of implementing in an internal side of the rigid base, said rigid base is selected from the group comprising: glass, metal, pressed craft paper, ceramic, wood, plastic, rubber, textile, leather, stone or any combination thereof, said step of implementing is carried out with the magnetic particles in the form of a magnetic powder with a characteristic maximum energy product $(BH)_{max}$ within the range between 2.0 and 100.00 kJ/$m^3$.

* * * * *